United States Patent [19]

Morduchowitz et al.

[11] 4,021,357
[45] May 3, 1977

[54] MULTIFUNCTIONAL TETRAPOLYMER LUBE OIL ADDITIVE

[75] Inventors: Abraham Morduchowitz, Monsey; Terence B. Jordan, Fishkill; Isaac D. Rubin, Wappingers Falls, all of N.Y.

[73] Assignee: Texaco Inc., New York, N.Y.

[22] Filed: Mar. 10, 1972

[21] Appl. No.: 233,774

[52] U.S. Cl. .......................................... 252/51.5 A
[51] Int. Cl.² .......................................... C10M 1/32
[58] Field of Search ............................. 252/51.5 A

[56] References Cited
UNITED STATES PATENTS

| | | | |
|---|---|---|---|
| 2,613,184 | 10/1952 | Catlin ........................... | 252/51.5 A |
| 2,998,414 | 8/1961 | West et al. ................... | 252/56 R X |
| 3,400,075 | 9/1968 | Grimm et al. ................ | 252/51.5 A |

FOREIGN PATENTS OR APPLICATIONS 757,915  9/1956  United Kingdom .......... 252/51.5 A

*Primary Examiner*—Delbert E. Gantz
*Assistant Examiner*—Andrew H. Metz
*Attorney, Agent, or Firm*—Thomas H. Whaley; Carl G. Ries; Robert A. Kulason

[57] ABSTRACT

A tetrapolymer of a first alkyl methacrylate of the formula:

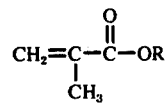

a second alkyl methacrylate of the formula:

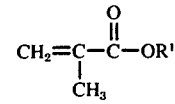

a third alkyl methacrylate of the formula:

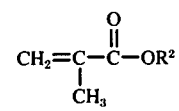

and a N, N-dialkylaminoalkyl methacrylamide of the formula:

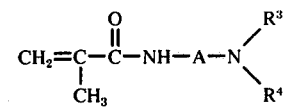

where R is alkyl of from 1 to 5 carbons, $R^1$ is alkyl of from 10 to 15 carbons, $R^2$ is alkyl of from 16 to 20 carbons, $R^3$ and $R^4$ are alkyl of from 1 to 2 carbons and A is a divalent alkylene radical of from 2 to 4 carbons, and hydrocarbon lubricating oil compositions containing dispersant and VI improving amounts of said tetrapolymer.

3 Claims, No Drawings

MULTIFUNCTIONAL TETRAPOLYMER LUBE OIL ADDITIVE

BACKGROUND OF INVENTION

Lubricating oils for present day internal combustion engines contain a multitude of additives functioning as detergent dispersants, viscosity index improvers, oxidation inhibitors, pour depressors, oiliness agents, etc., in order to meet the demands placed thereon. A widely used class of additives are the polymers of one or more alkyl acrylate or methacrylate and a dialkylaminoalkyl methacrylate such as tetrapolymer of butyl methacrylate, lauryl methacrylate, stearyl methacrylate and dimethylaminoethyl methacrylate. These amino containing methacrylates have the multiple properties of VI improving, pour depressing and detergent-dispersancy. Although the amino polymethacrylates are effective viscosity index improvers, pour depressors and/or detergent-dispersants, they are believed to be the source of a problem occurring with increasing frequency, in the modern high temperature internal combustion engines employing heavy duty multi-viscosity type lubricating oils, e.g., SAE 10W-40 grades. Specifically, the heavy duty motor oils containing the amino polymethacrylates in the high temperature engines after several thousand miles of usage undesirably substantially increase in apparent viscosity and in some instances the entire lubricating oil composition forms a gel. Investigation indicates that at high temperatures the engine "blow-by" appears to cause polymerization of the additives in these heavy duty oils. Engine "blow-by" is a mixture of the fuel vapors and combustion products of the cylinder which was blown past or "blow-by" the piston rings into the crankcase. In the absence of detergent-dispersant additives the "blow-by" coagulates causing sludge deposits.

SUMMARY OF INVENTION

We have discovered and this constitutes our invention a novel tetraploymer additive for hydrocarbon lubricating oils derived from a monomeric mixture of three alkyl methacrylates an N,N-dialkylaminoalkyl methacrylamide which is not only a superior detergent-dispersant and viscosity index improver, but is also resistant to oxidation and viscosity increasing polymerization when lubricating oil compositions containing said tetrapolymer are subjected to engine "blow-by" contact at high temperature, heavy operating conditions. This invention further relates to hydrocarbon lubricating oil compositions containing detergent-dispersant and viscosity index improving amounts of said tetrapolymer.

DETAILED DESCRIPTION OF THE INVENTON

Specifically, we have discovered a novel tetrapolymer consisting of a first alkyl methacrylate of the formula:

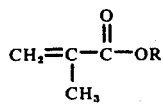

a second alkyl methacrylate of the formula:

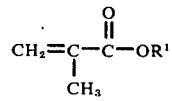

a third alkyl methacrylate of the formula:

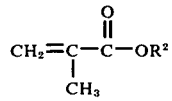

and N,N-dialkylaminoalkyl methacrylamide of the formula:

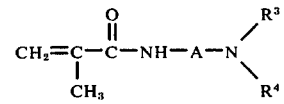

where R is alkyl of from 1 to 5 carbons, $R^1$ is alkyl of from 10 to 15 carbons, $R^2$ is alkyl of from 16 to 20 carbons, $R^3$ and $R^4$ are alkyl of from 1 to 2 carbons, A is a divalent alkylene radical of from 2 to 4 carbons, having an intrinsic viscosity in benzene of 77° F. of between about 0.18 and 2.15, a molecular weight of between about 25,000 and 2,500,000 and a component weight ratio of said first methacrylate to said second methacrylate to said third methacrylate to said methacrylamide of between about 15:62:20:3 and 25:40:25:10.

The tetrapolymer contemplated herein is prepared by contacting a mixture of first, second and third alkyl methacrylates and dialkylaminoalkyl methacrylamide in the presence of a polymerization catalyst and a chain stopper and in an inert atmosphere, preferably in the presence of between about 20 and 60 wt. % hydrocarbon lubricating oil as diluent. The reaction is advantageously conducted under conditions of agitation at a temperature between about 75 and 85° C. normally for a period of between about 4 and 9 hours, but in any case until the desired degree of polymerization measured by intrinsic viscosity is attained. This can be determined by the periodic sampling and testing of the reaction mixture.

In a typical polymerization procedure, the monomers are charged to the reactor together with diluent oil (if employed) followed by an introduction of the end stopping agent. Agitation and an inert gas (i.e. nitrogen) purge are initiated. Following the inert gas purging, polymerization catalyst is added and the reaction mixture is heated to the reaction temperature. The reaction is continued until the desired degree of polymerization is attained. The resultant product is a lube oil concentrate (if oil diluent is employed) norally containing between about 65 and 75 wt. % tetrapolymer. The concentrate can be subsequently diluted with additional hydrocarbon oil for handling and crankcase use.

Examples of the first alkyl methacrylate contemplated herein are methyl methacrylate, propyl methacrylate, butyl methacrylate and isopentyl methacrylate.

Examples of the second alkyl methacrylate monomer are decyl methacrylate, undecyl methacrylate, dodecyl methacrylate, tridecyl methacrylate, tetradecyl methacrylate and pentadecyl methacrylate.

Examples of the third alkyl methacrylate are hexadecyl methacrylate, heptadecyl methacrylate, octadecyl methacrylate and eicosyl methacrylate.

Since the commercial alkyl methacrylates are often manufactured utilizing crude alcohol reactants containing a mixture of alcohols, when methacrylate is recited hereinbefore and hereinafter it is intended to include not only the unmixed alkyl methacrylate products, but also to include mixtures of alkyl methacrylates with the particular recited alkyl methacrylate predominating.

Examples of the N,N-dialkylaminoalkyl methacrylamides are N,N-dimethylaminopropyl methacrylamide, N,N-diethylaminoethyl methacrylamide and N,N-dimethylaminobutyl methacrylamide. The methacrylamides are normally prepared by reacting the corresponding N,N-dialkylaminoalkylamine with methacroyl chloride.

Examples of the polymerization catalysts which may be utilized are any of the standard polymerization catalysts utilized in the polymerization of acrylic ester monomers such as the azo compounds disclosed in U.S. Pat. No. 2,471,959, e.g., azobisisobutronitrile. These azo initiators are normally employed in amounts of between about 0.1 and 0.5 wt. %. Additional examples are acetyl peroxide, benzoyl peroxide, lauryl peroxide, t-butyl peroxyisobutyrate and capryl peroxide.

Examples of the molecular weight moderators (chain stoppers) are any of the alkyl mercaptans of from $C_8$ to $C_{16}$ carbons such as lauryl mercaptan utilized in an amount of between about 0.1 and 0.3 wt. %.

The finished lubricating oil compositions contemplated herein suitable for use in internal combustion engines comprise a hydrocarbon lubricating oil in an amount of between about 85 and 99 wt. % containing between about 1 and 15 wt. % of the tetrapolymer. Normally, the lubricating oil compositions contemplated herein also contain additional additives such as supplementary detergent-dispersants, oxidation inhibitors, corrosion inhibitors, antifoamants, etc.

Examples of the supplementary detergent-dispersants contemplated herein are the ethylene oxide derivatives of inorganic phosphorus acid free, steamed hydrolyzed polyisobutene (700–5000 m.w.)—$P_2S_5$ reaction product, overbased calcium alkyl aromatic sulfonate having a total base number of at least about 300 and sulfurized normal calcium alkylphenolate. These supplementary detergent-dispersants are disclosed in U.S. Pat. No. 3,087,956, U.S. Pat. No. 3,549,534 and U.S. Pat. No. 3,537,966.

Examples of suitable antioxidants contemplated herein are zinc and cadmium dialkyldithiophosphates and diaryldithiophosphates, the alkylated diphenylamines, sulfurized alkylated diphenylamines, unsulfurized and sulfurized alkylphenols and phenolates, and hindered phenols.

Examples of suitable corrosion inhibitors are zinc dialkyldithiophosphate, zinc diaryldithiophosphate, basic calcium, barium and magnesium sulfonates; calcium, barium and magnesium phenolates.

The hydrocarbon lubricating oils employed in the finished lubricating compositions and as reaction diluent to form the concentrates are derived from a wide variety of hydrocarbon base oil materials such as naphthenic base, paraffinic base and mixed base mineral oils or other hydrocarbon lubricants, e.g., lubricating oils derived from coal products, synthetic hydrocarbon oils, e.g., polyalkylene such as polypropylene, polyisobutylene of a molecular weight of between about 250 and 2500. Advantageously, the base oils employed in the finished composition and diluents have an SUS viscosity at 100° F. of between about 50 and 2000, preferably between about 75 and 375. When the hydrocarbon oil is employed as diluent in the polymerization reactant, said diluent is carried over into the finished lubricating oil composition and forms part of the hydrocarbon oil base.

The following examples further illustrate the invention but are not to be construed as limitations thereof.

EXAMPLE I

This example illustrates the preparation of species of the tetrapolymer of the invention.

To a 1,000 mls. resin bottle reactor fitted with a stirrer, gas inlet and exit tubes, thermometer and condenser there was charged butyl methacrylate, commercial grade dodecyl methacrylate, commercial grade octadecyl methacrylate and N,N-dimethylaminopropyl methacrylamide (DMAPMA) along with hydrocarbon lubricating oil of naphthenic base stock having an SUS viscosity of about 145° at 100° F. The lube oil diluent was about 50 wt. % of the reaction mixture. To the reaction mixture lauryl mercaptan was added, stirring was initiated and the reaction mixture atmosphere was purged with nitrogen gas for a period of 0.75 hours followed by the addition of azobisisobutryonitrile. The reaction mixture was then heated at 77° C. (170° F.) for a period of two hours with continued stirring. The reaction appeared to be complete after the two hour period since the measurement of refractive index after that time appeared constant. The reaction mixture was diluted with additional hydrocarbon lubricating oil to afford a lube oil concentrate composition containing 43 wt. % tetrapolymer.

Two runs were made, Runs A and B. The tetrapolymer products from these runs were respectively identified as Additive A, the tetrapolymer of butyl methacrylate, dodecyl methacrylate, octadecyl methacrylate and N,N-dimethylamino-propyl methacrylate having a component weight ratio of 21:50:25:4 and Additive B of a component weight ratio of 4:10:5:1. The test data and results are reported below in Table I:

TABLE I

| TETRAPOLYMER MANUFACTURE AND ANALYSIS | | |
|---|---|---|
| Run No. | A | B |
| Reaction Ingredients, grams | | |
| Butyl Methacrylate | 42 | 40 |
| Dodecyl Methacrylate | 100 | 100 |
| Octadecyl Methacrylate | 50 | 50 |
| DMAPMA | 8 | 10 |
| Lauryl Mercaptan | 0.2 | 0.2 |
| Azobisisobutryonitrile | 0.7 | 0.7 |
| Tetrapolymer Analysis | | |
| Intrinsic Viscosity 77° F. in benzene | 0.85 | 0.92 |

EXAMPLE II

This example illustrates the outstanding resistance of the compositions of the invention to undesirable oil thickening polymerization under simulated engine conditions when subjected to contact with engine hydrocarbon "blow-by" at elevated temperatures. It further illustrates the superior dispersancy and oxidation resistance of the tetrapolymers of the invention in lubricating oil compositions.

Additives A and B (Chrysler test only) of Example I were subjected to the Viscosity Oven Test to measure resistance to oil thickening polymerization under "blow-by" elevated temperature conditions, the Bench Sludge Test for detergency and the Chrysler Heat Spot Test for measurement of detergency and oxidation stability. Tests were also conducted on comparative products.

The tests utilized are described as follows:

VISCOSITY INCREASING OVEN TEST

The test comprises heating a 20 mls. sample of a test oil composition in a volume ratio of test oil composition to hydrocarbon "blow-by" of 20 mls. to 10 mls. Control compositions were also subjected to the test without the hydrocarbon "blow-by". The viscosity of the test composition was measured before heating (0 hours) and after heating at 280° F. for a period of 24 and 48 hours with the difference between the viscosity between before and after heating being a measurement of the resistance of oil thickening of the test additive composition, the greater the difference the less resistance.

BENCH SLUDGE TESTS

The test procedure which measures the detergency properties of an additive comprises introducing into 20 cc bottle, portions of the test oil composition, titanium oxide (6 wt. %) in oil, aqueous and hydrocarbon engine "blow-by". The bottles are agitated at an elevated temperature of a period of time and a portion thereof is then centrifuged and visual observations are made of the sediment depth and the clear oil extending from the top of the sample downward in the tube. Subsequent to this first cycle, a second cycle is run, the second cycle comprising: to the samples remaining in the bottles in the first cycle adding portions of the following materials in the order listed: titanium oxide (6 wt. %) in oil, aqueous and hydrocarbon "blow-by" and the procedure of the first cycle is repeated. The depth of the sediment is measured in millimeters and the higher the measurement in millimeters the poorer the dispersancy.

CHRYSLER HEAT SPOT TEST

The Chrysler Heat Spot Test comprises placing 200 grams of oil in a Pyrex test tube, 15 × 400 mm., fitted with a cork containing a condenser. Copper wire catalyst in coil form placed on air lance is inserted in the tube. The entire test assembly was placed in a heated aluminum block so that the oil sample is maintained at 300° F. The oil sample is aerated with air at a rate of 25 mls/minute. Periodically, a portion of the sample is removed and a drop thereof is placed on a filter paper to form a spot. The test is terminated when the spot has uneven coloration. The longer period of time it takes for a discolored spot to appear, the greater the dispersancy and antioxidant properties of the test composition.

In addition to the previously described Run A and Run B products of Example I, the following is a description of comparative additives and other products utilized in the aforementioned tests:

1. Base Oil 5 is a paraffinic oil of

-continued an SUS viscosity of about 100 at 100° F.

2. Composition 15

| INGREDIENTS | Wt. % |
|---|---|
| Paraffinic Oil | 85.6 |
| Ethoxylated, Steam Hydrolyzed inorganic phosphorus acid free polyisobutene (1100 m.w.)-$P_2S_5$ reaction product | 9.1 |
| $CaCO_3$ overbased (TBN 300) calcium alkyl aromatic sulfonate | 3.6 |
| Zinc dialkyldithiophosphate | 1.1 |
| Alkylated Diphenylamine | 0.6 |
| SUS at 100° F. | 437 |

3. Composition 62

| INGREDIENTS | Wt. % |
|---|---|
| Paraffinic Oil | 94.3 |
| Terpolymer of methyl, lauryl and stearyl methacrylates (25:50:25 wt. ratio) | 3.4 |
| Calcium Petroleum Sulfonate (300 TBN) | 0.9 |
| Barium Soaps of Fatty Acids | 0.8 |
| Overbased zinc salts of aryl phosphinodithioic acid | 0.6 |
| SUS at 100° F. | 145 |
| Wt. % Zn | 0.08 |
| Wt. % Ba | 0.21 |
| Wt. % P | 0.065 |
| Wt. % S | 0.25 |

4. Additive 49

| INGREDIENTS | Wt. % |
|---|---|
| Tetrapolymer of butyl, lauryl, stearyl methacrylates and N,N-dimethylaminoethyl methacrylate (21:53:22:4 wt. ratio) | 35 |
| Naphthenic Oil | 65 |
| Intrinsic Viscosity, 77° F. benzene | 0.87 |

5. Additive 74

| INGREDIENTS | Wt. % |
|---|---|
| Tetrapolymer of butyl, lauryl, stearyl methacrylates and N,N-dimethylaminoethyl methacrylate (wt. ratio 21:50:25:4) | 41 |
| 100 Pale Oil | 59 |
| Intrinsic Viscosity. 77° F. benzene | 0.82 |

The test results are reported below in Tables II, III AND IV and demonstrate the superiority of the A and B tetrapolymer additive species over comparative additives 49 and 74.

TABLE II

EFFECT OF POLYACRYLATE ADDITIVE IN OIL COMPOSITION 15 ON THICKENING IN VISCOSITY INCREASING OVEN TEST

| Composition 15 +9.9 wt. % Additive | 0 Hours Kin. Visc., cs | 24 Hours cs. | 24 Hours % Visc. Incr. | 48 Hours cs. | 48 Hours % Visc. Incr. |
|---|---|---|---|---|---|
| A | 72.7 | 78.5 | 8.0 | 83.6 | 15 |
| A+Blow-by | 11.77 | — | — | 192.5 | 130 |
| 49 | 77.9 | 102.8 | 32 | 108.5 | 39 |
| 49+Blow-by | 14.13 | — | — | 983 | 805 |
| 74 | 96.3 | 101.0 | 4.9 | 107.2 | 11.3 |
| 74+Blow-by | 14.00 | — | — | 668.4 | 524 |

TABLE III

3 Wt. % Polyacrylate Additive in Base Oil 5 In Bench Sludge Test

| Polyacrylate Additive | Bench Sludge I | Bench Sludge II |
|---|---|---|
| A | 1.8 | 2.1 |
| 74 | 2.8 | 3.3 |
| 49 | 2.9 | 2.6 |
| None | 2.9 | 3.2 |

TABLE IV

PROPERTIES AND OXIDATION STABILITY OF 9 WT. % POLYACRYLATE IN OIL COMPOSITION 62

| Polyacrylate 9 Wt. % in Composition 62 | Additive A | Add. B | Add. 49 | Add. 74 |
|---|---|---|---|---|
| Vis. at 100° F., cs. | 33.9 | 33.6 | — | — |
| at 210° F., cs. | 7.30 | 7.29 | — | — |
| Pour Point, ° F. | −50 | −55 | — | — |
| Brookfield Vis. | | | | |
| at −20° F., cps. | 2,060 | 2,040 | — | — |
| at −40° F. | 21,500 | 20,250 | — | — |
| Chrysler Heat (Spot) Test | | | | |
| Hours to termination | 624 | 672 | ~415 | ~415 |

We claim:

1. A lubricating oil composition containing a major amount of hydrocarbon lubricating oil and between about 1 and 15 wt. % of a tetrapolymer of a first alkyl methacrylate of the formula:

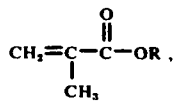

a second alkyl methacrylate:

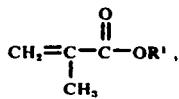

a third alkyl methacrylate:

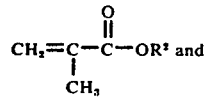

a N,N-dialkylaminoalkyl methacrylamide of the formula:

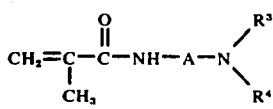

where R is alkyl of from 1 to 5 carbons, $R^1$ is alkyl of from 10 to 15 carbons, $R^2$ is alkyl of from 16 to 20 carbons, $R^3$ and $R^4$ are alkyl of from 1 to 2 carbons and A is a divalent alkylene radical of from 2 to 4 carbons, said tetrapolymer having an intrinsic viscosity in benzene at 77° F. of between about 0.18 and 2.15, and a component weight ratio of first methacrylate:second methacrylate:third methacrylate:dialkylaminoalkyl methacrylamide of between about 15:62:20:3 and 25:40:25:10.

2. A hydrocarbon lubricating composition in accordance with claim 1 wherein R is butyl, $R^1$ is dodecyl, $R^2$ is octadecyl, $R^3$ and $R^4$ are methyl and A is —$CH_2CH_2CH_2$—, said intrinsic viscosity is about 0.85 and said weight ratio is about 21:50:25:4.

3. A hydrocarbon lubricating oil composition in accordance with claim 1 wherein R is butyl, $R^1$ is dodecyl, $R^2$ is octadecyl, $R^3$ and $R^4$ are methyl and A is —$CH_2CH_2CH_2$—, said intrinsic viscosity is about 0.92 and said weight ratio is 4:10:5:1.

* * * * *